United States Patent [19]

Chang

[11] 4,089,987

[45] May 16, 1978

[54] WHIPPING COMPOSITION OF MODIFIED WHEY PROTEIN AND ADDITIVES

[75] Inventor: Pei K. Chang, Montrose, N.Y.

[73] Assignee: Stauffer Chemical Company, Westport, Conn.

[21] Appl. No.: 726,031

[22] Filed: Sep. 23, 1976

[51] Int. Cl.$^2$ .............................................. A23C 21/00
[52] U.S. Cl. ................................... 426/564; 426/583; 426/657
[58] Field of Search .............. 426/564, 570, 571, 572, 426/583, 656, 657; 260/112 R

[56] References Cited

U.S. PATENT DOCUMENTS

| | | | |
|---|---|---|---|
| 2,695,235 | 11/1954 | de Goede | 426/583 |
| 2,765,232 | 10/1956 | Rodgers et al. | 426/583 |
| 2,844,468 | 7/1958 | Gunther | 426/564 |
| 2,929,715 | 3/1960 | Sutton | 426/570 X |
| 3,356,507 | 12/1967 | Wingerd | 426/564 X |
| 3,487,064 | 12/1969 | Swanson et al. | 426/583 X |
| 3,628,968 | 12/1971 | Noznick et al. | 426/570 |
| 3,637,643 | 1/1972 | Wingerd | 426/656 X |
| 3,922,375 | 11/1975 | Dalan et al. | 426/583 |

*Primary Examiner*—Raymond N. Jones
*Assistant Examiner*—R. A. Yoncoskie
*Attorney, Agent, or Firm*—Paul J. Juettner

[57] ABSTRACT

An improved whippable whey protein containing composition is provided comprising a whey protein containing product having at least 20% soluble whey protein, in combination with a member selected from the group consisting of gelatin, gelatin and a water soluble polyphosphate, a gum and mixtures thereof, the whey protein containing product being prepared by:

a. ultrafiltration of cottage cheese whey; or b. adjusting the pH of a solution containing a whey protein to a value of from about 11 to about 13, thereafter reducing the pH to a value of from about 4 to about 6 to yield a water solution of a water soluble whey product and insoluble whey solids and separating the water soluble whey final product; or c. hydrolyzing the insoluble whey solids of step (b) at a pH of between about 11 and about 13; or d. combining liquid whey with an effective amount of sodium lauryl sulfate to form a whey protein-sodium lauryl sulfate complex which precipitates from solution, followed by reducing the sodium lauryl sulfate content of the complex to less than 0.1% by weight based on the dry weight of the complex.

The products prepared using the whey proteins of steps (a), and (b), can be used as egg albumen replacers in whipped products such as meringues, nougat candy and divinity candy. The products using the whey proteins of steps (c) and (d) can be used in preparing cakes such as yellow or sponge cake.

12 Claims, No Drawings

WHIPPING COMPOSITION OF MODIFIED WHEY PROTEIN AND ADDITIVES

The present invention relates to improved whippable whey protein compositions and improved whippable egg white replacement composition containing cheese whey protein.

BACKGROUND OF THE PRESENT INVENTION

Whipped egg whites find use as aerating agents in numerous food products. In some food products, the aerating agent must have a high tolerance to sugar and be heat setable to a light, airy and hard product such as a hard meringue. In baked goods, the aerating agent must have a good tolerance to flour and be able to set to an elastic state in such products as cakes. Egg white is able to perform both of these functions.

Due to the expense of egg whites, many attempts have been made to duplicate the aerating qualities of egg white with less expensive materials. The use of inexpensive vegetable proteins, such as soy protein, has not been successful. However, compositions containing hydrolyzed soy protein have been developed which are taught to provide useful whipping agents. For instance, U.S. Pat. No. 2,844,468 discloses a whipping composition comprising 70–90% enzyme modified soy protein, 3–15% polyphosphate such as sodium hexametaphosphate, and, optionally, 0–5% sodium aluminum sulfate. However, this product requires the use of an enzymatically modified or hydrolyzed soy protein. The enzyme treatment of the soy proteins must be carefully controlled to provide a bland flavored product with no off flavors. A distinctive flavor even if mild would be a disadvantage in some areas of use of whipping agents, such as meringues.

A number of prior art processes for forming an egg white substitute from whey proteins have been proposed. For example, in Netherlands Patent Application No. 72/14,837 (abstracted under Derwent Accession No. 37,726 V), in "Whipping Studies with Partially Delactosed Cheese Whey", by P. Jelen, in the Journal of Dairy Science, Vol. 56, No. 12, pp. 1505–1511, and in U.S. Pat. No. 3,583,968, heat treatment and pH adjustment procedures are advocated for formation of such products. The addition of hydrate of lime to a whey solution to form two liquid fractions is advocated in U.S. Pat. No. 1,387,754. Adjustment of the pH of the whey solution to about 9–10.5 with subsequent filtration is advocated in U.S. Pat. No. 3,695,235. Each of these approaches has certain disadvantages. The first three enumerated procedures require heating with consequent expenditure of energy and the latter two give a product having inferior utility particularly when the product is used in an egg meringue.

In copending application Ser. No. 582,489 there is disclosed a process for preparing an egg white substitute which in general terms, comprises adjusting the pH of a whey protein solution to a value of from about 11 to about 13 followed by a subsequent adjustment of the pH to a value of from about 4.0 to about 6.0 to yield a supernatant solution and a precipitate. This procedure is carried out in the absence of any heat treatment. The supernatant can be used as an egg white substitute, particularly in hard meringues. If the insolubles are rehydrolyzed at an alkaline pH of from about 11 to about 13 they can be used as an egg white substitute, particularly in soft meringues.

While these prior art materials are advocated for use as egg albumen replacers, most do not pass the sensitive test of hard meringue preparation. The egg white substitute should be able to foam, hold sugar and heat set. While these materials can provide some of these functions, improvements in functionality, stability of foams and heat set characteristics are required.

BRIEF DESCRIPTION OF THE INVENTION

In accordance with the present invention, an improved whippable whey protein containing composition is provided comprising a whey protein containing product having at least 20% soluble whey protein, the percentage being by weight based on the total weight of dry solids in said whey protein product in combination with a member selected from the group consisting of gelatin, gelatin and a water soluble polyphosphate, a gum and mixtures thereof, said whey protein containing product being prepared by any one of the following alternative methods:

a. ultrafiltration of cottage cheese whey; or
b. adjusting the pH of a solution containing a whey protein to a value of from about 11 to about 13, thereafter reducing the pH to a value of from about 4 to about 6 to yield a water solution of a water soluble whey product and insoluble whey solids and separating the water soluble whey final product; or
c. hydrolyzing the insoluble whey solids of step b) at a pH of between about 11 and about 13, or
d. combining liquid whey with an effective amount of sodium lauryl sulfate to form a whey protein-sodium lauryl sulfate complex which precipitates from solution, followed by reducing the sodium lauryl sulfate content of the complex to less than 0.1% by weight based on the dry weight of the complex.

The compositions of the present invention provide improved whipping characteristics over existing whippable whey protein containing products as well as the benefit of the excellent food value and lower cost of the whey proteins.

DETAILED DESCRIPTION OF THE PRESENT INVENTION

The gelatin used in the present invention can be either of the acid or alkaline prepared type. Preferably the acid type is used. Gelatins ranging in Bloom strength from about 100 Bloom to about 300 Bloom can be used, those within the range of from about 200 Bloom to about 250 Bloom being preferred.

The water soluble polyphosphates usable in the present invention are medium chain length polyphosphates of the formula:

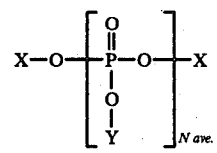

wherein X is selected from the group consisting of hydrogen and alkali metal; and Y is alkali metal; and N ave. represents an average chain length from about 3 to about 1,000. Preferably the average chain length is from 3 to 20. Representative compositions within this group are sodium or potassium tripolyphosphate, sodium or potassium tetrapolyphosphate, sodium or potassium hexametaphosphate, the preferred being sodium hexametaphosphate (average chain length 6–18).

The gums which can be used in the present invention include any of the edible gums or protective colloids such as carrageenan, alginates, such as sodium or potassium alginate, carboxymethylcellulose, accacia, guar, xanthan, and mixtures thereof. The preferred gum is carrageenan. The description of the invention will be directed to the preferred gum carrageenan though it is to be understood that this in no way limits the invention.

Carrageenan is an extract from red algae. Various carrageenans are commercially available products which can be in the kappa, lamba, or iota forms or mixtures thereof and in various salt forms such as sodium or potassium salt form, depending on which chloride was used in separating the carrageenan.

The amount of carrageenan used varies inversely with the milk gel strength of the carrageenan. As the gel strength increases, the amount of carrageenan required for effective results decreases. The use of an excessive amount of carrageenan tends to cause a reduction in the quality of the final product. For instance, carrageenans having a milk gel strength within the range of from about 90 to about 110 can be used in amounts up to 5% and preferably up to 3%. Effective amounts of carrageenan having different gel strengths can be easily determined by one skilled in the art. It is preferred to utilize the sodium salt of carrageenan extracted from the seaweed *Chondrus Crispus.*

The whey protein usable in the present invention includes any whippable whey protein. In general, to be whippable, the whey protein product must be high in protein content, have a large amount of undenatured protein and a limited amount of fat. Whey protein compositions which are whippable can be prepared by many processes.

The whey proteins which are usable in the compositions of the present invention include those derived from the ultrafiltration of acid or cottage cheese whey. An illustrative method for ultrafiltration is described by Horton, B. S. et al., Food Technol, Vol. 26, p. 30, 1972. This product comprises 40–80% protein (N × 6.32), 10–30% lactose, 3–15% ash, and 0.5–4% fat. This product is available commercially under the name ENRPRO ® and the designation "made from grade A milk" from Stauffer Chemical Company, Food Ingredients Division, Westport, Conn.

Also usable in the present invention are whey proteins converted into an egg white substitute by treating a normally acidic solution of whey proteins with an effective amount of a base or an ion exchange resin in the hydroxy form to give a solution with a pH of from about 11 to about 13, preferably from about 11 to about 12, and most preferably from about 11.5 to 11.9. This is preferably done at ambient temperature, e.g., from about 15° C. to about 25° C., and the whey solution is preferably allowed to remain at that pH for no longer than about 60 to about 180 minutes. The total solids content of the solution is from about 5% to 25% by weight. Any food grade base can be used to adjust the pH, such as sodium hydroxide, the preferred base, potassium hydroxide, calcium hydroxide and ammonium hydroxide.

Subsequent to treatment with a base, the solution is acidified to a pH within the range of from about 4.0 to about 6.0, preferably about 4.2 to about 5.0 (most preferably about 4.6), using any acid which is non-toxic and which is acceptable for food use. A preferred acid is hydrochloric acid. This acid adjustment is preferably carried out at a temperature of from about 15° C. to about 25° C. This procedure will yield a supernatant solution containing the desired modified whey protein product and a precipitate. These two can be easily separated from one another by settling and decantation, by centrifugation, or by any other conventional means known to the art. The latter specifically enumerated separation technique is preferred since it is faster and gives a greater degree of separation.

The modified whey protein product in the supernatant liquor differs in protein content from a product obtained by either treating a whey protein with base alone or from the insoluble material formed in the process. The supernatant liquor has a protein content of from about 20% to about 35% by weight. The supernatant liquor can be used as is, if refrigerated to prevent spoilage. Preferably, the supernatant liquor is dried to obtain a low molecular weight whey protein concentrate. It has functionality as an egg white substitute and can be used as an egg albumen replacer in hard meringue, nougat candy and divinity candy.

The insoluble product resulting from the present process can be converted into a product having utility as an egg white substitute, e.g., in a soft meringue or sponge cake, if it is subsequently hydrolyzed at an alkaline pH of about 11 to about 13. The insoluble product should remain at this alkaline pH for an extended length of time, e.g., about 3 to about 24 hours, at a temperature of from 20° C. to 40° C. to form this useful product containing a modified whey product whose structure has not been fully characterized. The solution resulting therefrom is whippable but does not have the sugar tolerance characteristics required for certain products, e.g., a hard meringue. It can be used, however, to form such products as a soft meringue or sponge cake, and the like. When this product is to be used in food products, e.g., meringues, which require the presence of low amounts of fat, e.g., below about 1–2%, by weight, it is advantageous to reduce the fat content, e.g., by extraction with a suitable organic solvent, such as petroleum ether, or by other conventional means.

The liquid cheese whey used as a starting material in this procedure can be selected from a wide variety of wheys including both sweet and acid whey. Examples are cheddar, cottage, cream, Swiss, ricotta and mozzarella. Also intended to be included within the term "cheese whey" are a number of whey protein concentrates. Such concentrates can be made by a number of processes including: an electrodialysis procedure (e.g., as described by Stribley, R. C., Food Processing, Vol. 24, No. 1, p. 49, 1963); by reverse osmosis; by ultrafiltration (e.g., as described by Horton B. S. et al., Food Technol, Vol. 26, p. 30, 1972); by alcohol precipitation (e.g., Morr et al. J. Dairy Sci., Vol. 53, p. 1162, 1970); or by gel filtration. When the ultrafiltration or gel filtration procedures are followed, the starting material can be the partially delactosed, demineralized product resulting from treatment of cheese whey with a divalent metal ion and adjustment of the pH to a value above 6 at a temperature below 140° F. in accordance with the teachings of U.S. Pat. No. 3,560,219 to Attebery followed by a concentration step to crystallize the lactose. This partially delactosed liquor can alternatively be passed through the bed of molecular sieve resin in accordance with U.S. Pat. No. Re. 27,806 to Dienst et al.

to yield two fractions, the first of which can be used as starting material for this invention or ultrafiltered, if desired.

Also usable in this procedure is the ultrafiltered cheese whey from cottage whey discussed earlier.

Another process for converting whey proteins into a composition usable in the present invention comprises adding to liquid cheese whey and preferably liquid acid cheese whey at a temperature of from about 10° C. to about 25° C. an effective amount of undissolved sodium lauryl sulfate to later cause precipitation of the protein as a sodium lauryl sulfate-protein complex, said addition being carried out when the cheese whey is at a pH of from about 6.0 to about 8.0, and thereafter adjusting the pH of the whey containing said sodium lauryl sulfate to a value of from about 2.0 to about 5.0 to cause precipitation of the complex.

The preferred liquid acid cheese whey is a well known by-product of cheese manufacture, including whey as cottage and cream wheys and cheese whey obtained by direct acidification of milk. Also usable, is whey and blends of sweet and acid wheys.

In using the preferred liquid acid cheese whey, it is desirable that the pH of the whey range of from about 6.0 to about 8.0 and preferably 6.5–7 and be at a temperature of from about 10° C. to about 25° C. and preferably 15°–25° C. when the undissolved sodium lauryl sulfate is first added. The weight ratio of sodium lauryl sulfate which is added in the case of liquid acid cheese whey to the whey protein content of the whey should be from about 0.35 to about 0.40.

After the sodium lauryl sulfate and liquid cheese whey have been added to one another at the above-described pH and temperature values, the pH of the mixture is then adjusted to those pH values which will give the desired degree of protein precipitation, i.e., from about 2.0 to about 5.0, e.g., from about 3.5 to about 4.0. The same temperatures as described above are maintained during this step. The resulting product which will then precipitate from solution is whey protein/sodium lauryl sulfate complex which has a protein content of from about 50% to about 60%, by weight. The sodium lauryl sulfate and protein are then separated from one another by a number of well known methods including: treatment with barium chloride, e.g., as described in J. Amer. Chem. Soc. 66: 692 (1944); dialysis, e.g., as described in J. Amer. Chem. Soc. 81:1400 (1959); treatment with acetone, e.g., as described in Ind. Eng. Chem. 36:372 (1944); or treatment with an anionic exchange resin, e.g., as described in J. Biological Chem. 246:4504 (1971). The whey protein after separation from the sodium lauryl sulfate is usable in the present invention.

The amount of whey protein concentrate used is generally dependent on the amount of additives used. Generally, the whey protein concentrates comprise at least 85% of the blend, the remainder of the blend upon which percentage is based being made up with gelatin, gelatin and polyphosphate and/or a gum. The gelatin can be used in an amount ranging from about 1 to about 10% and preferably from about 1% to about 5% by weight. When using gelating alone (no polyphosphate) it is more preferably used in an amount ranging from about 3% to about 5% by weight. When used in combination with the polyphosphate, results equivalent to those obtained using gelatin alone can be obtained using less gelatin. In some cases, the amount of gelatin used with the polyphosphate can be reduced by as much as 50% over the quantity of gelatin used alone while providing substantially equivalent results. When using the gelatin with the polyphosphates, the preferred amount of gelatin is from about 1 to about 3%, the preceding broad and intermediate ranges being applicable.

The polyphosphate used in the present invention is preferably sodium hexametaphosphate. Sodium hexametaphosphate has been found to be usable within the range of from about 5 to about 15% by weight, and preferably from about 6% to about 11%. In general, as the amount of polyphosphate increases, the amount of gelatin decreases. It is preferred that the additive total of gelatin and polyphosphate not exceed 15% and preferably not above 13%.

The gum is preferably used in an amount ranging from about 0.5% to an amount above which the final product shows adverse properties in the area of use. In general, the gum is not to exceed about 5% by weight based on the egg albumen replacer, the upper limit varying depending on the actual gum utilized. In some cases, more can be used and in some cases less. For example, it has been found that 5% of the preferred gum carrageenan (gel strength 90 to 110) while operable tends to show an adverse effect on the texture of a cake. For example, yellow cake prepared with the egg albumen replacer of the present invention containing 5% carrageenan shows a slightly harder texture than the control. It is preferred that the amount of carrageenan utilized not exceed 3% by weight of the egg albumen replacer.

If desired, sodium aluminum sulfate can be added to further improve the stability of the foam. Sodium aluminum sulfate can be used in an amount ranging from about 0 to about 5%, and preferably from about 1% to about 2% by weight of the egg albumen replacer.

Also, it has been found desirable to include from 0 to about 5% and preferably from about 1 to about 2.5% by weight of the egg albumen replacer of an acidifying agent in the form of anhydrous monocalcium phosphate. This agent also acts to contribute calcium ion to the system.

The products of the present invention can be prepared by dry blending the ingredients in the proportions desired. Liquid formulations can also be used but these require refrigeration. The products can be preblended for shipment to user or preblended in user's plant. Blending can also be accomplished in situ in the final use product.

The gelatin or gelatin-containing dry blend is preferably mixed in water and heated to dissolve the gelatin unless "cold-water soluble" gelatin is used.

The products of the present invention can be used as total or partial replacements for the egg albumen requirements of a recipe. If desired, the products of the present invention can be blended with egg albumen to form an extended egg albumen product. Liquid mixtures of albumen and the whey products of the invention can be prepared and frozen or dried as desired.

The products of the present invention can be used as total or partial replacements for the egg albumen requirement of a formulation. In hard meringues, total replacement of egg albumen can be achieved using the soluble fraction of an alkaline/acid treated whey. Whey protein concentrate prepared by the ultrafiltration of acid cheese whey can be used an an ggg albumen replacer in meringues. Candies can also be made with there products. The other whey concentrates disclosed hereinbefore (Steps (c) and (d)) are particularly useful in preparing soft meringues and cakes. The low molecular weight product prepared by the alkaline/acid treatment is preferably not used in flour containing baked goods since this product has limited flour tolerance.

The whey products of step (a) (ultrafiltered cottage whey) and step (d) (SLS precipitated protein) are effective for use in 100% replacement of egg albumen though a reduction in quality in the final product may be noted with the use of products from steps (a) and (d). Partial replacement of less than 75% and preferably of about 50% is preferred in those instances.

The percentages which are started to be by weight based on the total weight of the egg albumen replacer are intended to be based on the combined weight of the whey protein concentrate and additives unless otherwise stated.

The invention is more fully illustrated in the examples which follow.

EXAMPLE 1

(A) PREPARATION OF A LOW MOLECULAR WEIGHT WHEY PROTEIN CONCENTRATE

About 800 grams of a modified whey product formed from the first fraction obtained by passing partially delactosed cheese whey mother liquor through a molecular sieve resin, as described in U.S. Pat. No. Re. 27,806, (available commercially as ENRPRO® 50 from Stauffer Chemical Company, Food Ingredients Division, Westport, Conn.) was added to about 4200 ml. of water to form a dispersion having a solids content of about 16%, by weight. This dispersion was treated with 1N NaOH at 24°–25° C. to adjust the pH to about 11.7 and was allowed to remain for 90 minutes at this pH. This solution was adjusted to about pH 4.6 with hydrochloric acid. The precipitate and the supernatant fraction (without pH adjustment) were isolated by centrifugation. The supernatant fraction was freeze dried before use as a replacement for dry egg albumen.

(B) PREPARATION OF A HIGH MOLECULAR WEIGHT WHEY PROTEIN CONCENTRATE

The insoluble fraction which was separated from the supernatant in Step A was admixed with water to form a dispersion of 5–10% solids and hydrolyzed by treating the same with sodium hydroxide at a pH of 11.7 at a temperature of 25° C. for a period of at least 8 hours. At the end of the hydrolysis, the trace amount of insolubles that remained was removed by centrifugation. The supernatant containing the functional fraction was then neutralized to a pH of 7.0. This product was freeze-dried prior to use.

EXAMPLE 2

PREPARATION OF A SODIUM LAURYL SULFATE PRECIPITATED PROTEIN

A modified cheese whey formed by passing a partially delactosed whey liquor through the bed of molecular sieve resin according to U.S. Pat. No. Re. 27,806 and separating the first fraction therefrom which was reacted with sodium lauryl sulfate. The whey product has the following typical composition: Protein 50–55% by weight; Lactose 20–30%; Ash 8–12%; Fat 2–3% maximum; Lactate 2–3%; and Citrate 2–3%. About 1368 grams of sodium lauryl sulfate was added to 60 liters of liquid modified whey (12% dispersion, pH 6.5), and the pH was adjusted to 3.75 with 4.5 liters of 4N hydrochloric acid. The mixture was centrifuged and the precipitate was recovered and washed twice with between 1 and 2 volume measures of acidified (pH 3.75) distilled water. The washed product was centrifuged at about 2,000 rpm and its pH was adjusted to 6.5 with 1N sodium hydroxide.

The whey protein-sodium lauryl sulfate complex was then diluted to a solids content of about 10%, and this solution was added to three consecutive batches of 5 liters of anion exchange resin (Duolite A-102 D, hydroxy form). The contact time in each batch of resin was about 15 minutes. At the end, the final product was neutralized to pH 7.0 and was freeze-dried. The final product had a sodium lauryl sulfate content of about 0.09%.

EXAMPLES 3–12

HARD MERINGUE

Hard egg meringues were prepared by dissolving 15 grams of either egg albumen and/or one of the replacement products in 135 grams of water. To the solution were added 0.27 grams of monocalcium phosphate, anhydrous, and the mixture was stirred for 15 minutes. It was then poured into a Hobart C-100 mixer equipped with a 2184 liter (3 quart) bowl and was whipped at a speed of 3. After an initial 2 minutes whipping time, 297 grams of sugar were added in 1 tablespoon increments every 10 seconds during the whipping. The whipping was continued at a speed of 3 until the mix reached the stiff peak stage (about 10 minutes).

The specific gravity and the pH of the foams were measured. The results are reported in Table I below.

70 grams of the meringue was baked at 66.6° C. (150° F.) for 2¼ hours.

The meringue was dried overnight at 26.7° C. (80° F.) in a bread oven.

The specific volume of the baked meringue was then measured.

The results are reported in Table I below:

TABLE I

| Hard Meringue | 3 | 4 | 5 | 6 | 7 | 8 | 9 | 10 | 11 | 12 |
|---|---|---|---|---|---|---|---|---|---|---|
| (grams) | | | | | | | | | | |
| Low Mol. Weight Whey Protein Concentrate* | 12.78 | 12.78 | 12.78 | 12.78 | 12.78 | 12.78 | 12.78 | 12.78 | 12.78 | 15 g** |
| Anhydrous Monocalcium Phosphate - g | — | .27 | .27 | .27 | .27 | .27 | .27 | .27 | .27 | .27 |
| Sodium Hexametaphosphate - g | — | — | 1.02 | — | — | — | 1.02 | 1.50 | 1.02 | CONTROL |
| Gelatin - g | — | — | — | 0.615 | — | — | 0.615 | 0.307 | 0.615 | LEG |
| Sodium Aluminum Sulfate - g | — | — | — | — | 0.255 | — | — | — | 0.255 | ALBUMEN |
| Citric Acid - g | — | — | — | — | — | 0.330 | — | — | 0.330 | |
| Sugar - g | 2.22 | 2.22 | 1.2 | 1.605 | 1.965 | 1.89 | .583 | .413 | 0 | 0 |
| Foam Specific Gravity | 0.265 | 0.260 | 0.255 | 0.245 | 0.270 | 0.290 | 0.260 | 0.255 | 0.245 | 0.337 |
| Meringue Specific Volume | 6.44 | 6.34 | 6.12 | 7.14 | 6.37 | 6.00 | 6.68 | 6.99 | 7.02 | 6.35 |

TABLE I-continued

| Hard Meringue | 3 | 4 | 5 | 6 | 7 | 8 | 9 | 10 | 11 | 12 |
|---|---|---|---|---|---|---|---|---|---|---|
| Meringue pH | 4.6 | 4.8 | 5.1 | 4.9 | 4.6 | 4.3 | 4.6 | 4.7 | 4.4 | 5.9 |

*Prepared using the procedure of Example 1.
**Egg Albumen.

TABLE IA
CONDITION OF BAKED MERINGUE

| Example No. | Remarks |
|---|---|
| 3 | Slightly Flat — Few Peaks |
| 4 | Slightly Flat — Few Peaks |
| 5 | Good Peaks — Top Collapsed |
| 6 | Good Peaks |
| 7 | Sagging Peaks |
| 8 | Few Peaks |
| 9 | Good Peaks |
| 10 | Good Peaks |
| 11 | Good Peaks |
| 12 | Good Firm Peaks |

As can be seen from the results of Table I, hard meringues prepared with gelatin (Ex. 6) and gelatin/polyphosphate blends (Ex. 9, 10 and 11) showed good foam specific gravity and meringue specific volume over the whey protein concentrate alone (Ex. 3). Translated to final use, the meringues of Examples 6, 9, 10 and 11 containing gelatin alone or in combination with the polyphosphates showed good peaks approximating egg albumen meringue (Example 12). A meringue prepared with sodium hexametaphosphate (Example 5), while evidencing good peaks, failed since the top of the meringue collapsed.

EXAMPLES 13–16

SPONGE CAKE

A sponge cake was prepared by blending 300 grams of cake flour, 360 grams of sugar, 22.5 grams of non-fat dry milk, 9.4 grams of salt, and 8.5 grams of baking powder in a blender for 15 minutes to prepare a dry cake mix.

700 grams of cake mix was mixed with 37 grams of egg yolk solids and 16 grams dry albumen or albumen replacer in a 2.84 liter (3 quart) bowl of a Hobart mixer (C-100) equipped with a wire whip and mixed at speed No. 1 for 5 minutes.

To this mixture was added 15 grams of a mono and diglyceride emulsifier (Atmos G-2462), 210 milliliters of ice water and 2 milliliters of vanilla. The entire mixture was mixed 0.5 minute at speed No. 1, 1 minute at speed No. 2, 3 minutes at speed 3 and 3 minutes at speed No. 3. The walls of the bowl were scraped after each mixing period.

To this mixture was added 150 milliliters of ice water and mixing was continued for 0.5 minute at speed No. 1, 2 minutes at speed No. 2, 4 minutes at speed No. 1 and 2 minutes at speed No. 2. The walls of the bowl were scraped after each mixing period.

The specific gravity and the temperature of the batter was measured.

283 grams of batter were weighed into two 16.61 centimeter (6.5 inch) pans. The cakes were baked in a 190.1° C. (375° F.) oven for 30–35 minutes.

The specific volume of the cake was measured after sitting 1 hour at room temperature.

The break force required to penetrate the cake was measured on a Marine Colloid gel tester which measured the force in grams required for a medium size plunger to penetrate into the cake interior at low speed. Grain was determined visually. A rating of one means good grain, a rating of one and one half means very slightly open grain and a rating of two means slightly open grain.

TABLE II

| EXAMPLE | 13 | 14 | 15 | 16 |
|---|---|---|---|---|
| Albumen | 100% | 50% | 50% | 50% |
| High Molecular Weight Whey Protein Concentrate* | — | 50% | 50% | 50% |
| Carrageenan | — | — | 1% | — |
| Sodium Hexametaphosphate | — | — | — | 10% |
| Gelatin | — | — | — | 2% |
| Specific Gravity (Batter) | 0.47 | 0.51 | 0.49 | 0.48 |
| Temperature (Batter) | 24.4° C. (76° F) | 23.3° C. (74° F) | 23.9° C (75° F) | — |
| Specific Volume (Cake) | 4.91 | 4.57 | 4.76 | 4.90 |
| Grain (Cake) | 1 | 1.5 | 1 | 2 |
| Break Force (grams) (Cake) | 340 | 360 | 320 | — |

As can be seen from the results reported in Table II, the product of the invention, i.e., the products of Examples 15 and 16 provide substantially the same specific volume in the cake as the egg white control. A 50/50 blend of egg white and the whey protein concentrate alone (Example 14) was not able to provide the same specific volume as the control.

EXAMPLES 17–22

YELLOW CAKE

A yellow cake was prepared by sifting together 236.3 grams cake flour, 280.6 grams Baker's Special sugar, 18.3 grams superheat non-fat dry milk, 22.8 grams dry egg yolk, 9.1 grams egg albumen or albumen replacer, 6.5 grams salt, 5.6 grams sodium aluminum phosphate leavening acid (BL-60, Stauffer Chemical Company), 4.7 grams soda, 2.6 grams gelatinized wheat starch, 0.59 grams carboxymethyl cellulose. The dry ingredients were blended in a Hobart C-100 mixer at speed No. 1 for 5 minutes. 555 grams of the dry mix were weighed into a Hobart C-100 mixer equipped with a small bowl and paddle. 63.1 grams of shortening (Durkee D-21) and 5 grams of mono and diglycerides (Atmos-2962) were added to the dry mix with mixing at speed No. 1 for 4 minutes. After blending, 180 cubic centimeters of water were added. The mixture was mixed for 30 seconds at speed No. 1 and 4 minutes at speed No. 3. The bowl was scraped after each mixing.

An additional 170 cubic centimeters of water was added with mixing and scraping. The mixture was then mixed for 4 minutes at speed No. 1 and the sides of the bowl were scraped.

410 grams of the mixture were weighed into each of two 20.32 centimeter (8 inch) pans. The cakes were baked at 190.1° C. (375° F.) for about 29 minutes.

The cakes were removed from the oven and the specific volume of the cakes was measured after sitting 1 hour at room temperature.

The break force required to penetrate the cake was also measured on a gel tester which measured the force required for a plunger to penetrate into the cake interior. The difference in break force between cakes made with products of the invention and the controls is interpreted as differences in texture. In the rating, zero means no difference, a plus sign means firmer than the control and a minus sign means weaker than the control.

TABLE III

| Example No. | 17 | 18 | 19 | 20 | 21 | 22 |
|---|---|---|---|---|---|---|
| Egg Albumen | 100% | 50% | 50% | 50% | 50% | 50% |
| SLS precipitated Protein (c) | — | 50% | 50% | 50% | 50% | 50% |
| Additives | — | — | (a) | (b) 1% | (b) 2.5% | (b) 5.0% |
| Specific Volume | 3.39 | 3.43 | 3.39 | 3.34 | 3.36 | 3.20 |
| Difference in Break force | 0 | −40 | +6 | 0 | +5 | +10 |

(a) 6.8% sodium hexametaphosphate, 4.1% gelatin (220 Bloom), 1.7% sodium aluminum sulfate, 1.0% citric acid.
(b) Carrageenan
(c) Sodium lauryl sulfate precipitated protein prepared using the procedure of Example 2.

The results as reported in Table III show that yellow cakes prepared with SLS precipitated protein in place of egg albumen were deficient in break force, i.e., texture, as compared to the egg albumen control. These deficiencies are overcome by using the compositions of the present invention containing either a combination of sodium hexametaphosphate-gelatin-sodium aluminum sulfate-citric acid or carrageenan.

EXAMPLES 23 & 24

NOUGAT CANDY

A nougat candy was prepared by preparing a frappe mixture and a bob (sucrose-corn syrup mixture) and blending the two.

The frappe was prepared by hydrating 65 grams of egg albumen or egg albumen replacer with 130 milliliters of water.

In a separate stainless steel beaker, a syrup for the frappe was prepared by cooking together 1350 grams of corn syrup, 415 grams of sucrose and 650 grams of invert sugar at 118.3° C., (245° F.)

After the syrup had cooled to 60° C. (140° F.), the syrup and the hydrated albumen or albumen replacer were mixed together and whipped in the 11.36 liter (12 quart) mixing bowl of a model AS-200T Hobart mixer using the paddle mixer. The whipping was conducted at speed No. 1 for 2 minutes, speed No. 2 for one minute and Speed Number 3 until the mixture was light. The specific gravity of the frappe was measured and is reported in Table IV below.

The bob prepared by cooking 415 grams of corn syrup and 1865 grams of sucrose to a temperature of 146.1° C. (295° F.) in a stainless steel beaker.

After the bob had cooled to 115.5° C. (240° F.), it was blended with the frappe while mixing at a speed of No. 1 in the Hobart mixer for approximately 2-3 minutes. 100 grams of vegetable fat (melted) was then added with mixing and the mixing continued for 2 minutes. Ten grams of vanilla extract were then added with mixing for an additional 2 minutes. The specific gravity of the candy was measured. The candy was spread on wax paper and cooled.

TABLE IV

| Example | 23 | 24 |
|---|---|---|
| Egg Albumen | 100 | 75 |
| Low Molecular weight whey protein concentrate* | — | 25 |
| Frappe Specific Gravity | 0.68 | 0.67 |

TABLE IV-continued

| Example | 23 | 24 |
|---|---|---|
| Specific Gravity (Nougat) | 0.93 | 0.89 |

*PREPARED USING THE PROCEDURE OF EXAMPLE 1

EXAMPLES 25–27

DIVINITY CANDY

A divinity candy was prepared by blending 497 grams of sugar, 217 grams of corn syrup, 112 grams of water, and 1.5 grams of salt. This blend was heated to 129.1° C. (265° F) without stirring.

In another vessel, 8.4 grams of dry egg albumen or albumen replacer, and anhydrous monocalcium phosphate in an amount listed in the table below were hydrated in 59.5 milliliters of water and dispersed at speed No. 10 in a Kitchen aid mixer to form a foam. The specific gravity of the foam was checked and is reported below.

The hot syrup mixture was slowly added to the prewhipped foam of the previous step while whipping at speed No. 8 for 2 minutes. The whipping was continued at speed No. 10 for an additional 6 minutes or until the mixture lost gloss.

2.2 grams of vanilla was then blended in and whipping continued for 2 minutes.

The mixture was spread on wax paper and allowed to cool.

The candy was tested for specific volume and hardness on a Precision Penetrometer using a cone loaded with a weight of 20 grams. The results of the tests on the candy preparation are reported below in Table V.

TABLE V

| | DIVINITY CANDY | | | | |
|---|---|---|---|---|---|
| EXAMPLE | 25 | 26 | 27 | 28 | 29 |
| Albumen | 100% | 50 | 50 | 100 | 75 |
| Low Molecular Weight Whey Protein Concentrate | — | 50 | — | — | — |
| Product of Invention(a) | — | — | 50 | — | 25 |
| Anhydrous Monocalcium Phosphate | 0.58 gm. | 0.29 | 0.29 | 0.58 | 0.435 |
| Specific Gravity Foam | 0.065 | 0.056 | 0.054 | 0.064 | 0.061 |
| Specific Volume | 1.46 | 1.23 | 1.22 | 1.45 | 1.39 |
| Hardness (1/10 mm) | 83** | 28** | 73** | 123** 44**** | 125** 56*** |

(a)Low mol. weight whey protein concentrate* containing 6.8% sodium hexametaphosphate, 4.1% gelatin, (220 Bloom), and 1.7% sodium aluminum sulfate.
*Prepared using the procedure of Example 1.
**Stored at room temperature for 10 days
***Stored at room temperature for two days
****Stored inside the desicator for two days As can be seen from the data, candy prepared using a 50/50 blend of egg albumen and the low molecular weight whey protein concentrate of Example 26 is substantially harder than either egg albumen alone or a 50/50 blend of egg albumen and the low molecular weight whey protein concentrate as modified by the present invention. The composition of the present invention is more like the egg albumen replacer than the prior art material.

EXAMPLES 30–32

SOFT MERINGUE

A soft meringue was prepared by dissolving dry albumen or albumen replacer in the amount given in Table VI in 93 milliliters of water, 4.8 grams of cream of tartar was mixed with the predissolved egg albumen or replacer in a Hobart C-100 mixer equipped with a 3 quart bowl and were whipped for 1 minute at speed No. 3. 136 grams of sugar was added gradually at a rate of about 1 tablespoon per 10 seconds while mixing. Mixing was continued for a total of 10 minutes. The specific gravity of the foam was then measured. The stability of the foam was determined by the syneresis rate, i.e., the time needed to form one drop of liquid.

A 40 grams sample was then baked in a 204.4° C. (400° F) oven for 7 minutes. The physical condition of the meringue was recorded.

The results are reported in Table VI below.

TABLE VI

| Example | Soft Meringue | | |
|---|---|---|---|
| | 30 | 31 | 32 |
| Egg Albumen | 6.6 | 6.6 | 13.2 g |
| Ultrafiltered Cottage Cheese Whey (50% whey protein) | 6.6 g | 5.808 | — |
| Sodium Hexametaphosphate | — | .66 | — |
| Gelatin | — | .132 | — |
| Foam Specific Gravity | 0.230 | 0.216 | 0.190 |
| Foam Syneresis* - hours | 1.5 | 3.0 | 3.5 |
| Condition of Meringue | Rounded Peaks | Stiff Peaks | Stiff Peaks |

*Time in hours required to form first drop of liquid.

As can be seen from the data reported in Table VI, the product of the invention containing an ultrafiltered cottage cheese whey protein in combination with sodium hexametaphosphate and gelatin as a 50% replacement for the egg albumen in the soft meringue shows an improvement in whipping qualities over a 50/50 blend of egg albumen and the ultrafiltered cottage whey protein as evidenced by a reduction in specific gravity and also an improvement in the stability of the meringue as evidenced by a two fold increase in the syneresis time.

The invention is defined in the claims which follow. What is claimed is:

1. An improved whippable whey protein containing composition comprising at least 85% of a whey protein containing product having at least 20 parts soluble whey protein per 100 parts of dry solids in said whey protein product in combination with a number selected from the group consisting of from about 1% to about 10% gelatin; from about 1% to about 10% gelatin and from about 5% to about 15% of a water soluble polyphosphate, the additive total of gelatin and phosphate not to exceed about 15%; from about 0.5% to about 5% of a gum; and mixtures thereof; said whey protein containing product being selected from the group consisting of:

a. a whey protein concentrate derived by the ultrafiltration of cottage cheese whey;
   b. a water soluble low molecular weight whey protein product prepared by adjusting the pH of a solution containing a whey protein to a value of from about 11 to about 13, thereafter reducing the pH to a value of from about 4 to about 6 to yield a water solution of a water soluble whey product and insoluble whey solids, separating the water soluble whey final product and drying the same;
   c. a whey protein product prepared by hydrolyzing the insoluble whey solids of step (b) at a pH of between about 11 and about 13 for a period of time and at a temperature sufficient to hydrolyze the same; and
   d. a precipitated whey protein prepared by combining liquid whey with an effective amount of sodium lauryl sulfate to form a sodium lauryl sulfate-protein complex which precipitates from solution, followed by reducing the sodium lauryl sulfate content of the complex to less than 0.1% by weight based on the dry weight of the complex, all percentages are by weight based on the total weight of the whey-protein containing composition.

2. The whippable composition as recited in claim 1 wherein said member is gelatin.

3. The whippable composition as recited in claim 1 wherein said member is gelatin and a water soluble polyphosphate.

4. The whippable composition as recited in claim 3 wherein said polyphosphate is sodium hexametaphosphate.

5. The whippable composition as recited in claim 1 wherein said member is a gum.

6. The whippable composition as recited in claim 5 wherein said gum is selected from the group consisting of carrageenan, sodium alginate, potassium alginate, accacia, carboxymethylcellulose, guar, xanthan and mixtures thereof.

7. The whippable composition as recited in claim 6 wherein said gum is carrageenan.

8. The whippable composition as recited in claim 1 wherein said soluble protein content is at least 25%.

9. The whippable composition as recited in claim 1 wherein said solution containing whey protein in step (b) is the first fraction obtained by passing partially delactosed cheese whey through a bed of molecular sieve resin.

10. The whippable composition as recited in claim 1, step (b) wherein the pH of said solution containing whey protein is adjusted to about 11.5 to about 11.9 for from 1 to 3 hours followed by reducing the pH to a value within the range of from about 4.2 to about 5.0.

11. The whippable composition as recited in claim 1 wherein said liquid whey of step (d) is the first fraction obtained by passing partially delactosed cheese whey through a bed of molecular sieve resin.

12. The whippable composition as recited in claim 1 wherein said sodium lauryl sulfate content in step (d) is reduced by passing the complex through an ion exchange resin in the hydroxy form.

* * * * *